United States Patent
Ravelli et al.

(10) Patent No.: US 11,869,525 B2
(45) Date of Patent: Jan. 9, 2024

(54) METHOD AND APPARATUS FOR PROCESSING AN AUDIO SIGNAL, AUDIO DECODER, AND AUDIO ENCODER TO FILTER A DISCONTINUITY BY A FILTER WHICH DEPENDS ON TWO FIR FILTERS AND PITCH LAG

(71) Applicant: Fraunhofer-Gesellschaft zur Foerderung der angewandten Forschung e.V., Munich (DE)

(72) Inventors: Emmanuel Ravelli, Erlangen (DE); Manuel Jander, Hemhofen (DE); Grzegorz Pietrzyk, Nuremberg (DE); Martin Dietz, Nuremberg (DE); Marc Gayer, Erlangen (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 0 days.

(21) Appl. No.: 17/592,423

(22) Filed: Feb. 3, 2022

(65) Prior Publication Data

US 2022/0157328 A1 May 19, 2022

Related U.S. Application Data

(63) Continuation of application No. 15/412,920, filed on Jan. 23, 2017, now abandoned, which is a (Continued)

(30) Foreign Application Priority Data

Jul. 28, 2014 (EP) .................................. 14178821

(51) Int. Cl.
*G10L 19/005* (2013.01)
*G10L 19/03* (2013.01)
(Continued)

(52) U.S. Cl.
CPC ............ *G10L 19/26* (2013.01); *G10L 19/005* (2013.01); *G10L 19/022* (2013.01); *G10L 19/03* (2013.01);
(Continued)

(58) Field of Classification Search
CPC ....... G10L 19/005; G10L 19/03; G10L 19/12; H04B 1/1027
(Continued)

(56) References Cited

U.S. PATENT DOCUMENTS 4,969,192 A  11/1990 Chen et al.
5,012,517 A   4/1991 Wilson et al.
(Continued)

FOREIGN PATENT DOCUMENTS

CN  1708908 A  12/2005
CN  1901383 A   1/2007
(Continued)

OTHER PUBLICATIONS

"Information technology—MPEG audio technologies—Part 3: Unified speech and audio coding", ISO/IEC JTC 1/SC 29, ISO/IEC FDIS 23003-3:2011(E), ISO/IEC JTC 1/SC 29/WG 11, Sep. 20, 2011, 1-291.

(Continued)

*Primary Examiner* — Farzad Kazeminezhad
(74) *Attorney, Agent, or Firm* — Perkins Coie LLP; Michael A. Glenn

(57) ABSTRACT

A method is described that processes an audio signal. A discontinuity between a filtered past frame and a filtered current frame of the audio signal is removed using linear predictive filtering.

6 Claims, 7 Drawing Sheets

Related U.S. Application Data continuation of application No. PCT/EP2015/065219, filed on Jul. 3, 2015.

(51) Int. Cl.
| | |
|---|---|
| *G10L 19/12* | (2013.01) |
| *H04B 1/10* | (2006.01) |
| *G10L 19/26* | (2013.01) |
| *G10L 19/022* | (2013.01) |
| *G10L 19/20* | (2013.01) |
| G10L 21/0364 | (2013.01) |
| G11B 27/038 | (2006.01) |

(52) U.S. Cl.
CPC .............. *G10L 19/12* (2013.01); *G10L 19/20* (2013.01); *G10L 21/0364* (2013.01); *G11B 27/038* (2013.01); *H04B 1/1027* (2013.01)

(58) Field of Classification Search
USPC ................. 704/500, 219, 207, 222
See application file for complete search history.

(56) References Cited

U.S. PATENT DOCUMENTS

| | | | |
|---|---|---|---|
| 5,727,123 A | 3/1998 | Mcdonough et al. | |
| 5,999,899 A | 12/1999 | Robinson | |
| 6,584,438 B1 | 6/2003 | Manjunath et al. | |
| 7,353,168 B2 | 4/2008 | Thyssen et al. | |
| 7,613,606 B2 | 11/2009 | Makinen | |
| 8,000,969 B2 | 8/2011 | Da et al. | |
| 10,325,611 B2 | 6/2019 | Ravelli et al. | |
| 2006/0087464 A1 | 4/2006 | Moriya et al. | |
| 2007/0033015 A1 | 2/2007 | Taira et al. | |
| 2007/0225971 A1 | 9/2007 | Bessette | |
| 2008/0294429 A1* | 11/2008 | Su ......................... | G10L 19/20 704/E19.042 |
| 2009/0083047 A1 | 3/2009 | Lindahl et al. | |
| 2011/0085483 A1 | 4/2011 | Yeon et al. | |
| 2011/0106529 A1 | 5/2011 | Disch et al. | |
| 2011/0119054 A1 | 5/2011 | Lee et al. | |
| 2011/0173008 A1 | 7/2011 | Lecomte et al. | |
| 2011/0218797 A1 | 9/2011 | Mittal et al. | |
| 2011/0238426 A1 | 9/2011 | Fuchs et al. | |
| 2012/0101824 A1 | 4/2012 | Chen | |
| 2012/0271644 A1 | 10/2012 | Bessette et al. | |
| 2013/0030798 A1 | 1/2013 | Mittal et al. | |
| 2013/0124215 A1 | 5/2013 | Lecomte et al. | |
| 2017/0133028 A1 | 5/2017 | Ravelli et al. | |

FOREIGN PATENT DOCUMENTS

| | | |
|---|---|---|
| CN | 101355692 A | 1/2009 |
| CN | 101527138 A | 9/2009 |
| CN | 101976566 A | 2/2011 |
| CN | 102150203 A | 8/2011 |
| CN | 1957398 B | 9/2011 |
| CN | 103109318 A | 5/2013 |
| CN | 103703512 A | 4/2014 |
| EP | 732687 A2 | 9/1996 |
| EP | 0843301 A2 | 5/1998 |
| EP | 2144171 B1 | 5/2018 |
| JP | H09127996 A | 5/1997 |
| JP | 2011528134 A | 11/2011 |
| KR | 101997006 B1 | 7/2019 |
| RU | 2183034 C2 | 5/2002 |
| RU | 2199157 C2 | 2/2003 |
| RU | 2498419 C2 | 11/2013 |
| WO | 9839768 A1 | 9/1998 |
| WO | 2007138511 A1 | 12/2007 |
| WO | 2009109139 A1 | 9/2009 |
| WO | 2010003491 A1 | 1/2010 |
| WO | 2010036061 A2 | 4/2010 |
| WO | 2011085483 A1 | 7/2011 |

OTHER PUBLICATIONS

Munos-Expósito, J. E., et al., "Speech/music discrimination using a warped LPS-based feature and a fuzzy expert system for intelligent audio coding", European Signal Processing Conference, 2006.

* cited by examiner

METHOD AND APPARATUS FOR PROCESSING AN AUDIO SIGNAL, AUDIO DECODER, AND AUDIO ENCODER TO FILTER A DISCONTINUITY BY A FILTER WHICH DEPENDS ON TWO FIR FILTERS AND PITCH LAG

CROSS-REFERENCE TO RELATED APPLICATIONS

This application is a continuation of copending U.S. patent application Ser. No. 15/412,920, filed Jan. 23, 2017, which is incorporated herein by reference in its entirety, which in turn is a continuation of copending International Application No. PCT/EP2015/065219, filed Jul. 3, 2015, which is incorporated herein by reference in its entirety, and additionally claims priority from European Application No. 14178821.6, filed Jul. 28, 2014, which is also incorporated herein by reference in its entirety.

BACKGROUND OF THE INVENTION

The present invention relates to the field of audio signals, more specifically to an approach for processing an audio signal including a plurality of audio frames, wherein discontinuities between consecutive filtered audio frames are reduced or omitted.

In the field of audio signal processing, an audio signal may be filtered for various reasons, e.g., a long-term prediction filter may be used in an audio signal encoder, to attenuate or even suppress completely a set of harmonics in the audio signal.

The audio signal includes a plurality of audio frames, and the frames are filtered using the long-term prediction filter. When considering two consecutive frames of an audio signal, a past frame and a current frame, a linear filter H(z) having a set of parameters c is used for filtering the audio signal. More specifically, the past frame is filtered with the filter H(z) using a first set of parameters $c_0$ which will produce a so-called filtered past frame. The current frame is filtered with the filter H(z) using a set of parameters $c_1$ which will produce a filtered current frame. FIG. 1 shows a block diagram for processing consecutive frames of an audio signal in accordance with a known approach. An audio signal 100 including a plurality of audio frames is provided. The audio signal 100 is supplied to a filter block 102 and a current frame n of the audio signal 100 is filtered. The filter block, besides the audio signal 100, receives a set of filter parameters $c_n$ for the current frame of the audio signal. The filter block 102 filters the current frame n of the audio signal and outputs a filtered audio signal 104 including consecutive filtered frames. In FIG. 1, the filtered current frame n, the filtered past frame n–1 and the filtered second last frame n–2 are schematically depicted. The filtered frames are schematically represented in FIG. 1 with respective gaps therebetween for schematically indicating a discontinuity 106a, 106b that may be introduced by the filtering process between the filtered frames. The filter block 102 causes filtering of the frames of the audio signal using respective filter parameters $c_0$ and $c_1$ for a past frame n–1 and a current frame n. In general, the filter block 102 may be a linear filter H(z), and one example for such a linear filter H(z) is the above mentioned long-term prediction filter $$H(z)=1-g\cdot z^{-T}$$

where the filter parameters are the gain "g" and the pitch lag "T". In a more general form, the long-term prediction filter can be described as follows:

$$H(z)=1-g\cdot A(z)\cdot z^{-T}$$

where A(z) is a FIR filter. A long-term prediction filter may be used to attenuate or even suppress completely a set of harmonics in an audio signal. However, there is a high probability of introducing a discontinuity 106a, 106b (see FIG. 1) between the filtered past frame n–1 and the filtered current frame n when using such a long-term prediction filter and when the past frame filter parameters $c_0$ are different from the current frame filter parameters $c_1$. This discontinuity may produce an artifact in the filtered audio signal 104, for example a "click".

Consequently, in view of the above described problems with the filtering of consecutive frames resulting in discontinuities which, in turn, may produce undesired artifacts, a technique is needed that removes a possible discontinuity. Several known approaches dealing with the removal of a discontinuity of filtered frames of an audio signal are known in the art.

In case the linear filter H(z) is a FIR filter, the current frame is filtered with the filter parameters $c_1$ of the current frame for producing a filtered current frame. In addition, a beginning portion of the current frame is filtered with the filter parameters of the past frame $c_0$ for producing a filtered frame portion, and then an overlap-add or cross-fade operation is performed over the beginning portion of the filtered current frame and the filtered frame portion. FIG. 2 shows a block diagram of such a conventional approach for processing consecutive audio frames for removing a discontinuity. When compared to FIG. 1, the filter block 102 includes a further processing block 108 for performing the overlap-add or cross-fade operation. In the filtered audio signal 104, there will be no or a reduced discontinuity between the consecutive filtered frames, as is schematically indicated in FIG. 2 showing the consecutive filtered frames n, n–1 and n–2 without the gaps of FIG. 1.

In other known approaches, the filter H(z) may be a filter having a recursive part, for example an IIR filter. In such a case, the approach as described above with regard to FIG. 2 is applied on a sample-by-sample basis. In a first step, the processing starts with the first sample of the beginning portion of the current frame n being filtered with the filter parameters $c_0$ of the past frame n–1 yielding a first filtered sample. The sample is also filtered with the filter parameters $c_1$ of the current frame n producing a second filtered sample. Then, the overlap-add or cross-fade operation is performed based on the first and second filtered samples which yields the corresponding sample of the filtered current frame n. Then the next sample is processed and the above steps are repeated until the last sample of the beginning portion of the current frame n has been processed. The remaining samples of the current frame n are filtered with the filter parameters $c_1$ of the current frame n.

Examples for the above mentioned known approaches for removing a discontinuity from consecutive filtered frames are described, for example, in U.S. Pat. No. 5,012,517 A in the context of a transform coder, in EP 0732687 A2 in the context of a speech bandwidth expander, in U.S. Pat. No. 5,999,899 A in the context of a transform audio coder, or in U.S. Pat. No. 7,353,168 B2 in the context of a decoded speech postfilter.

While the above approaches are efficient for removing the undesired signal discontinuities, since these approaches operate on a specific portion of the current frame, the beginning portion, for being effective, the length of the frame portion has to be sufficiently long, for example in the case of a frame length of 20 ms, the frame portion or beginning portion length could be as long as 5 ms. In certain cases, this can be too long, especially in situations where the past frame filter parameters $c_0$ will not apply well to the current frame and this may result in additional artifacts. One example is a harmonic audio signal with fast changing pitch, and a long-term prediction filter that is designed to reduce the amplitude of the harmonics. In that case, the pitch-lag is different from one frame to the next. The long-term prediction filter with the pitch estimated in the current frame would effectively reduce the amplitude of the harmonics in the current frame, but it would not reduce the amplitude of the harmonics if used in another frame (e.g. beginning portion of the next frame) where the pitch of the audio signal would be different. It could even make things worse, by reducing the amplitude of non-harmonic-related components in the signal, introducing a distortion in the signal It is an object underlying the present invention to provide an improved approach for removing discontinuities among filtered audio frames without producing any potential distortion in the filtered audio signal.

SUMMARY

According to an embodiment, a method for processing an audio signal may have the step of: removing a discontinuity between a filtered past frame and a filtered current frame of the audio signal using linear predictive filtering.

Another embodiment may have a non-transitory digital storage medium having stored thereon a computer program product for performing a method for processing an audio signal, the method having the step of: removing a discontinuity between a filtered past frame and a filtered current frame of the audio signal using linear predictive filtering, when said computer program is run by a computer.

Still another embodiment may have an apparatus for processing an audio signal, wherein the apparatus comprises a processor for removing a discontinuity between a filtered past frame and a filtered current frame of the audio signal using linear predictive filtering, or wherein the apparatus is configured to operate according to a method for processing an audio signal, the method having removing a discontinuity between a filtered past frame and a filtered current frame of the audio signal using linear predictive filtering.

Another embodiment may have an audio decoder having the above inventive apparatus for processing an audio signal.

Another embodiment may have an audio encoder having the above inventive apparatus for processing an audio signal.

The present invention provides a method for processing an audio signal, the method comprising removing a discontinuity between a filtered past frame and a filtered current frame of the audio signal using linear predictive filtering.

The linear predictive filter can be defined as $$A(z) = \frac{1}{\sum_{m=0}^{M} a_m z^{-m}}$$

with M the filter order and $a_m$ the filter coefficients (with $a_0=1$). This kind of filter is also known as Linear Predictive Coding (LPC).

In accordance with embodiments, the method comprises filtering the current frame of the audio signal and removing the discontinuity by modifying a beginning portion of the filtered current frame by a signal obtained by linear predictive filtering a predefined signal with initial states of the linear predictive filter defined on the basis of a last part of the past frame.

In accordance with embodiments, the initial states of the linear predictive filter are defined on the basis of a last part of the unfiltered past frame filtered using the set of filter parameters for filtering the current frame.

In accordance with embodiments, the method comprises estimating the linear predictive filter on the filtered or non-filtered audio signal.

In accordance with embodiments, estimating the linear predictive filter comprises estimating the filter based on the past or current frame of the audio signal or based on the past filtered frame of the audio signal using the Levinson-Durbin algorithm.

In accordance with embodiments, the linear predictive filter comprises a linear predictive filter of an audio codec.

In accordance with embodiments, removing the discontinuity comprises processing the beginning portion of the filtered current frame, wherein the beginning portion of the current frame has a predefined number of samples being less or equal than the total number of samples in the current frame, and wherein processing the beginning portion of the current frame comprises subtracting a beginning portion of a zero-input-response (ZIR) from the beginning portion of the filtered current frame.

In accordance with embodiments, the method comprises filtering the current frame of the audio signal using a non-recursive filter, like a FIR filter, for producing the filtered current frame.

In accordance with embodiments, the method comprises processing the unfiltered current frame of the audio signal on a sample-by-sample basis using a recursive filter, like an IIR filter, and wherein processing a sample of the beginning portion of the current frame comprises:
  filtering the sample with the recursive filter using the filter parameters of the current frame for producing a filtered sample, and
  subtracting a corresponding ZIR sample from the filtered sample for producing the corresponding sample of the filtered current frame.

In accordance with embodiments, filtering and subtracting are repeated until the last sample in the beginning portion of the current frame is processed, and wherein the method further comprises filtering the remaining samples in the current frame with the recursive filter using the filter parameters of the current frame.

In accordance with embodiments, the method comprises generating the ZIR, wherein generating the ZIR comprises:
  filtering the M last samples of the unfiltered past frame with the filter and the filter parameters used for filtering the current frame for producing a first portion of filtered signal, wherein M is the linear predictive filter order,
  subtracting from the first portion of filtered signal the M last samples of the filtered past frame, filtered using the filter parameters of the past frame, for generating a second portion of filtered signal, and
  generating a ZIR of a linear predictive filter by filtering a frame of zero samples with the linear predictive filter and initial states equal to the second portion of filtered signal.

In accordance with embodiments, the method comprises windowing the ZIR such that its amplitude decreases faster to zero.

The present invention is based on the inventor's findings that the problems that have been recognized in conventional approaches for removing signal discontinuities which result in the additional unwanted distortion mentioned above, are mainly due to the processing of the current frame or at least a portion thereof on the basis of the filter parameters for the past frame. In accordance with the inventive approach this is avoided, i.e. the inventive approach does not filter a portion of the current frame with the filter parameters of the past frame and thus avoids the problems mentioned above. In accordance with embodiments, for removing the discontinuity, an LPC filter (linear predictive filter) is used for removing the discontinuity. The LPC filter may be estimated on the audio signal and therefore it is a good model of the spectral shape of the audio signal so that, when using the LPC filter, the spectral shape of the audio signal will mask the discontinuity. In an embodiment, the LPC filter may be estimated on the basis of the non-filtered audio signal or on the basis of an audio signal that has been filtered by a linear filter H(z) mentioned above. In accordance with embodiments, the LPC filter may be estimated by using the audio signal, for example the current frame and/or the past frame, and the Levinson-Durbin algorithm. It may also be computed only on the basis of the past filtered frame signal using the Levinson-Durbin algorithm.

In yet other embodiments, an audio codec for processing the audio signal may use a linear filter H(z) and may also use an LPC filter, either quantized or not, for example to shape the quantization noise in a transform-based audio codec. In such an embodiment, this existing LPC filter can be directly used for smoothing the discontinuity without the additional complexity needed to estimate a new LPC filter.

BRIEF DESCRIPTION OF THE DRAWINGS

In the following, embodiments of the present invention will be described with reference to the accompanying drawings, in which.

DETAILED DESCRIPTION OF THE INVENTION

In the following, embodiments of the inventive approach will be described in further detail and it is noted that in the accompanying drawing elements having the same or similar functionality are denoted by the same reference signs.

Figure 3:
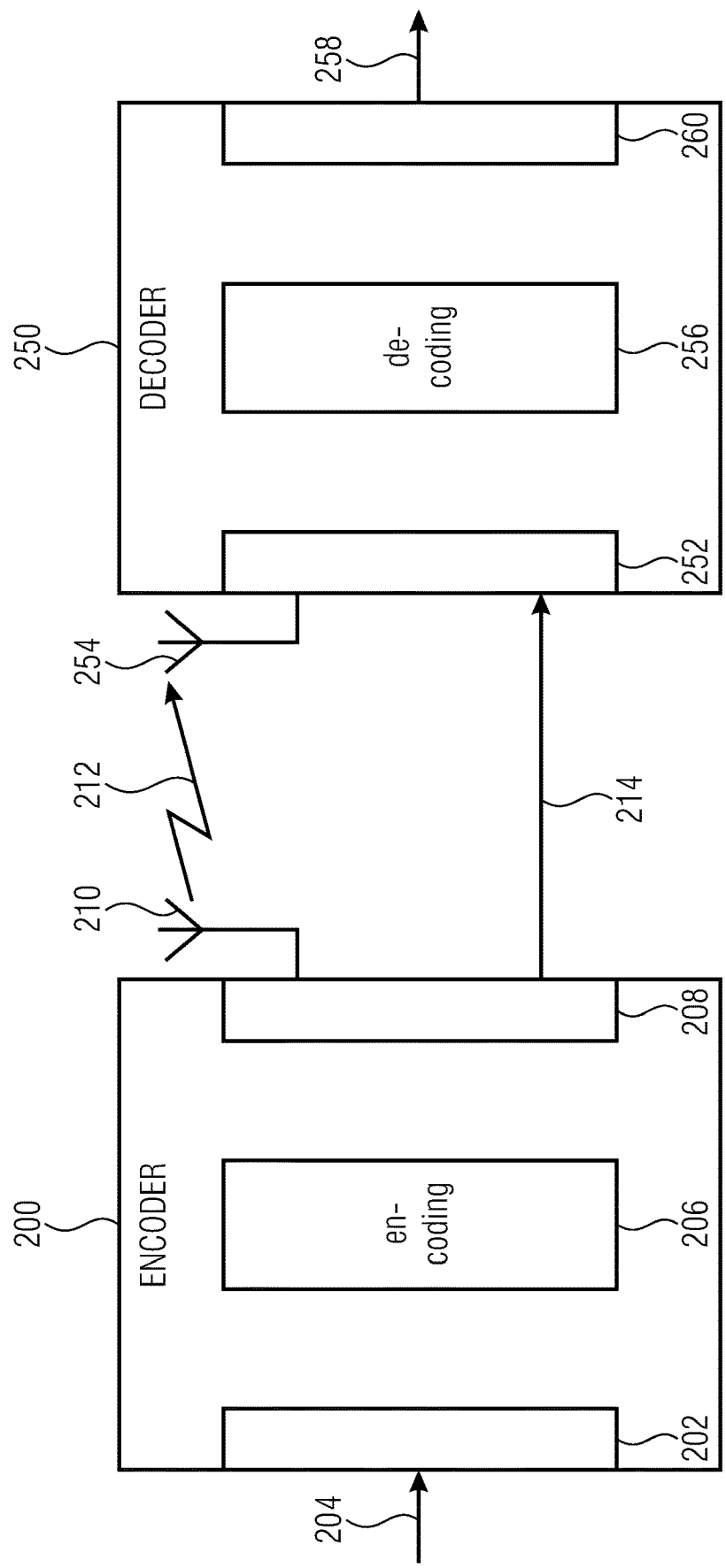
FIG. 3 shows a simplified block diagram of a system for transmitting audio signals implementing the inventive approach for removing a discontinuity between consecutive frames of an audio signal at the encoder side and/or at the decoder side.

FIG. 3 shows a simplified block diagram of a system for transmitting audio signals implementing the inventive approach at the encoder side and/or at the decoder side. The system of FIG. 3 comprises an encoder 200 receiving at an input 202 an audio signal 204. The encoder includes an encoding processor 206 receiving the audio signal 204 and generating an encoded audio signal that is provided at an output 208 of the encoder. The encoding processor may be programmed or built to implement the inventive approach for processing consecutive audio frames of the audio signal received to avoid discontinuities. In other embodiments the encoder does not need to be part of a transmission system, however, it can be a standalone device generating encoded audio signals or it may be part of an audio signal transmitter. In accordance with an embodiment, the encoder 200 may comprise an antenna 210 to allow for a wireless transmission of the audio signal, as is indicated at 212. In other embodiments, the encoder 200 may output the encoded audio signal provided at the output 208 using a wired connection line, as it is for example indicated at reference sign 214.

The system of FIG. 3 further comprises a decoder 250 having an input 252 receiving an encoded audio signal to be processed by the encoder 250, e.g. via the wired line 214 or via an antenna 254. The encoder 250 comprises a decoding processor 256 operating on the encoded signal and providing a decoded audio signal 258 at an output 260. The decoding processor 256 may be implemented to operate in accordance with the inventive approach on consecutive frames that are filtered in such a way that discontinuities are avoided. In other embodiments the decoder does not need to be part of a transmission system, rather, it may be a standalone device for decoding encoded audio signals or it may be part of an audio signal receiver.

Figure 4:
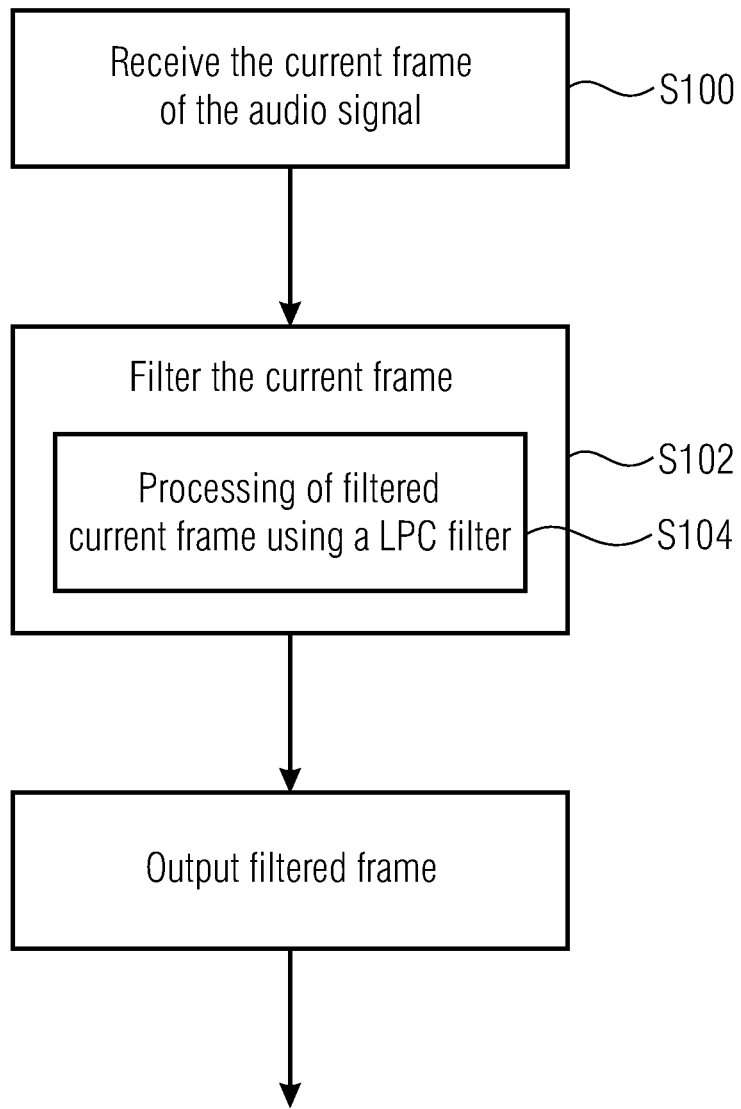
FIG. 4 shows a flow diagram depicting the inventive approach for removing a discontinuity between consecutive frames of an audio signal in accordance with an embodiment.

In the following, embodiments of the inventive approach that may be implemented in at least one of the encoding processor 206 and the decoding processor 256 will be described in further detail. FIG. 4 shows a flow diagram for processing a current frame of the audio signal in accordance with an embodiment of the inventive approach. The processing of the current frame will be described, and the past frame is assumed to be already processed with the same technique described below. In accordance with the present invention, in step S100 a current frame of the audio signal is received. The current frame is filtered in step S102, for example in a way as described above with regard to FIGS. 1 and 2 (see filter block 102). In accordance with the inventive approach, a discontinuity between the filtered past frame n−1 and the filtered current frame n (see FIG. 1 or 2) will be removed using linear predictive filtering as is indicated at step S104. In accordance an embodiment the linear predictive filter may be defined as $$A(z) = \frac{1}{\sum_{m=0}^{M} a_m z^{-m}}$$

with M the filter order and $a_m$ the filter coefficients (with $a_0=1$). This kind of filter is also known as Linear Predictive Coding (LPC). In accordance with embodiments the filtered current frame is processed by applying linear predictive filtering to at least a part of the filtered current frame. The discontinuity may be removed by modifying a beginning portion of the filtered current frame by a signal obtained by linear predictive filtering a predefined signal with initial states of the linear predictive coding filter defined on the basis of a last part of the past frame. The initial states of the linear predictive coding filter may be defined on the basis of a last part of the past frame filtered using the set of filter parameters for the current frame. The inventive approach is advantageous as it does not require filtering the current frame of an audio signal with a filter coefficient that is used for the past frame and thereby avoids problems that arise due to the mismatch of the filter parameters for the current frame and for the past frame as they are experienced in the known approaches described above with reference to FIG. 2.

Figure 1:
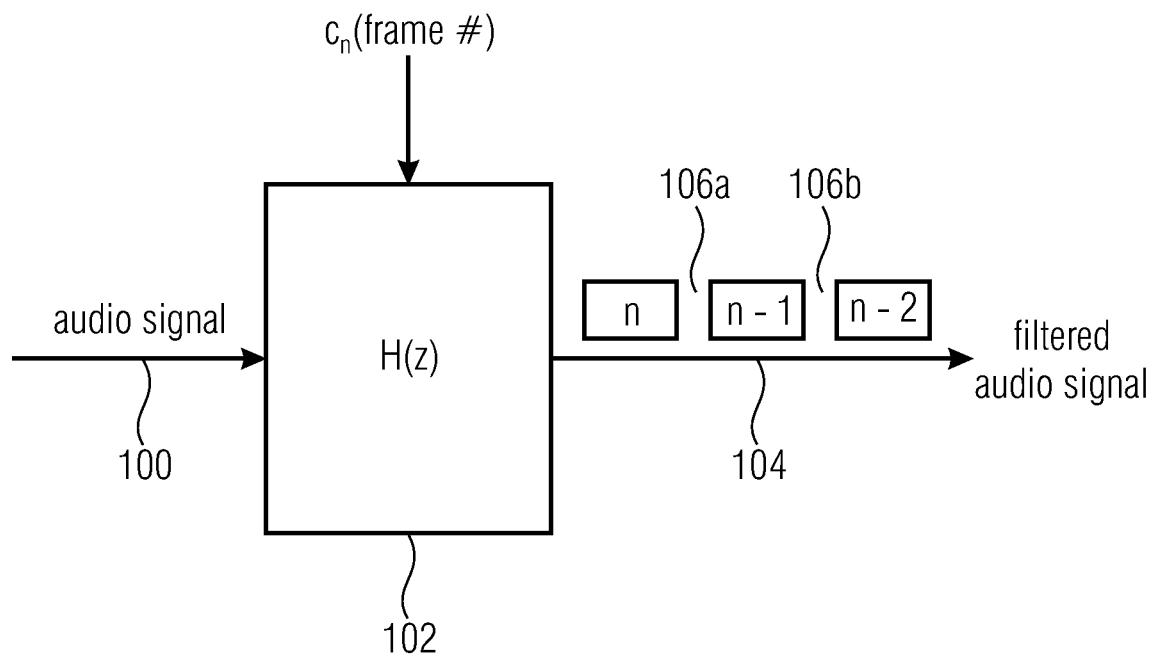
FIG. 1 shows a block diagram for processing consecutive frames of an audio signal in accordance with a conventional approach.
Figure 2:
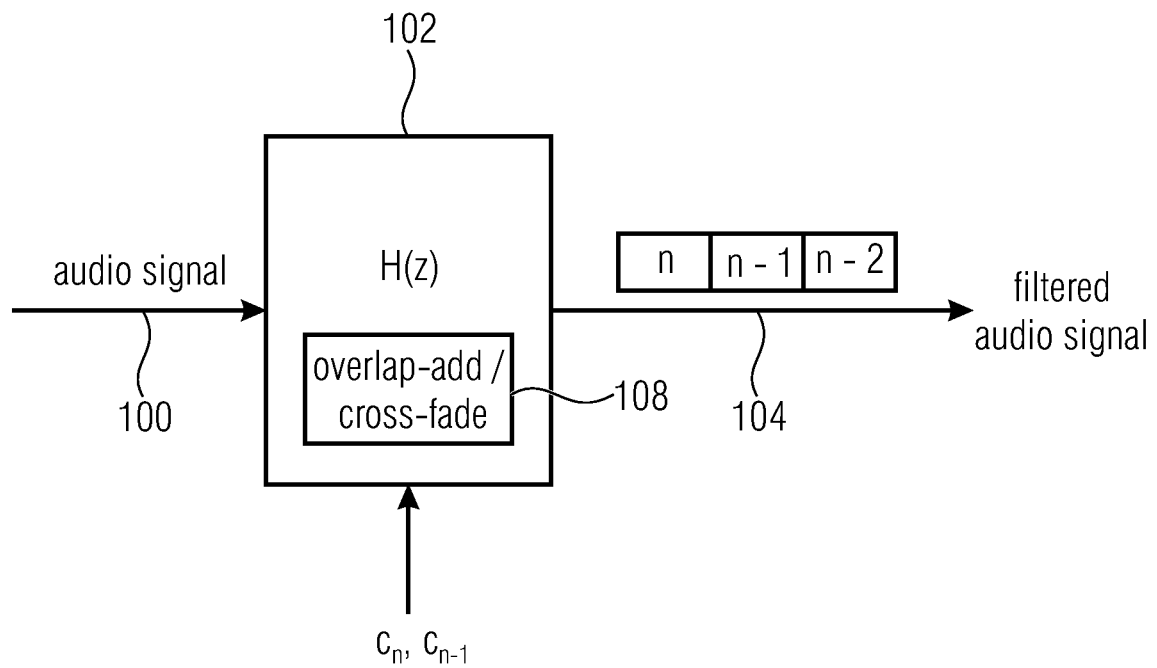
FIG. 2 shows a block diagram of another conventional approach for processing consecutive audio frames for removing a discontinuity.
Figure 5:
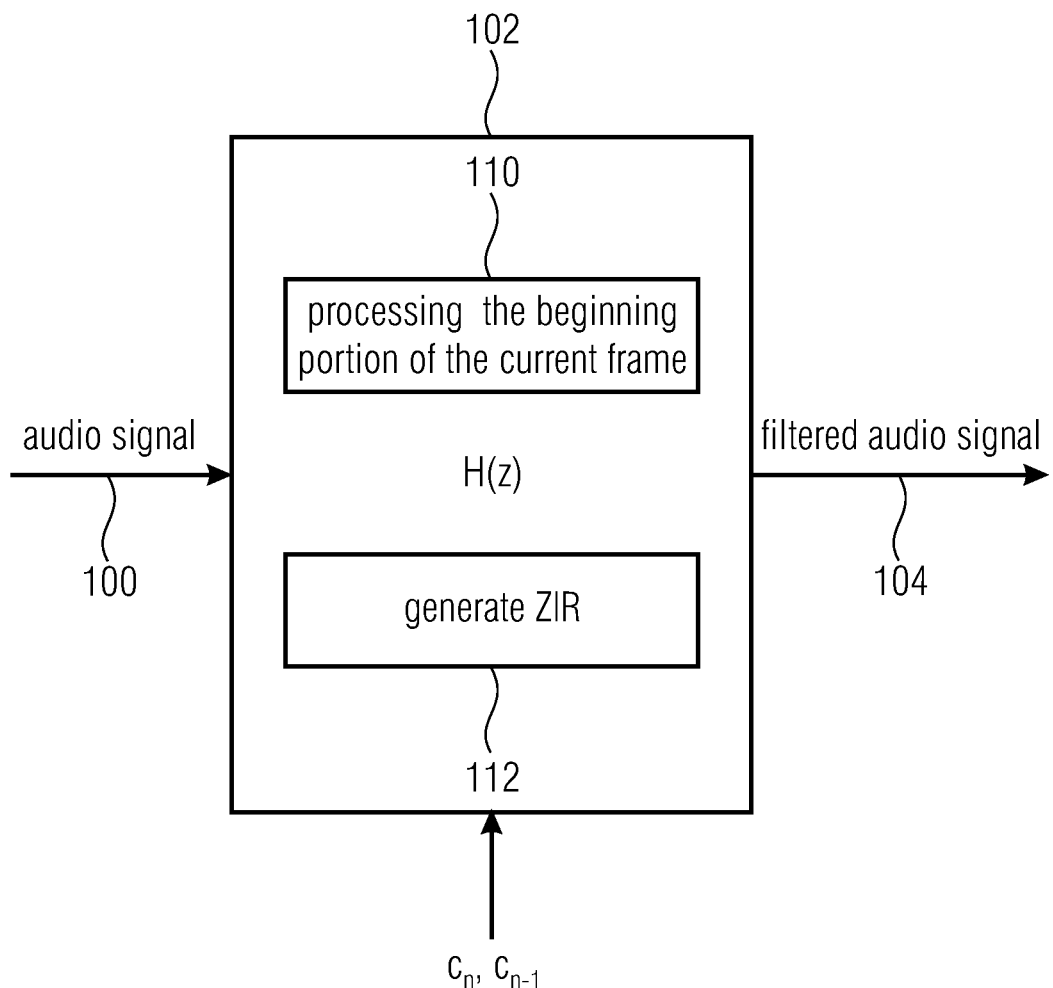
FIG. 5 shows a schematic block diagram for processing a current audio frame in accordance with embodiments of the present invention avoiding undesired distortion in the output signal despite the removal of the discontinuities.

FIG. 5 shows a schematic block diagram for processing a current audio frame of the audio signal in accordance with embodiments of the present invention avoiding undesired distortion in the output signal despite the removal of the discontinuities. In FIG. 5, the same reference signs as in FIGS. 1 and 2 are used. A current frame n of the audio signal 100 is received, each frame of the audio signal 100 having a plurality of samples. The current frame n of the audio signal 100 is processed by the filter block 102. When compared to the known approaches of FIGS. 1 and 2, in accordance with embodiments as described with regard to FIG. 5, the filtered current frame is further processed on the basis of ZIR samples as is schematically shown by block 110. In accordance with an embodiment on the basis of the past frame n−1, and on the basis of an LPC filter the ZIR samples are produced as is schematically shown by block 112.

Figure 6:
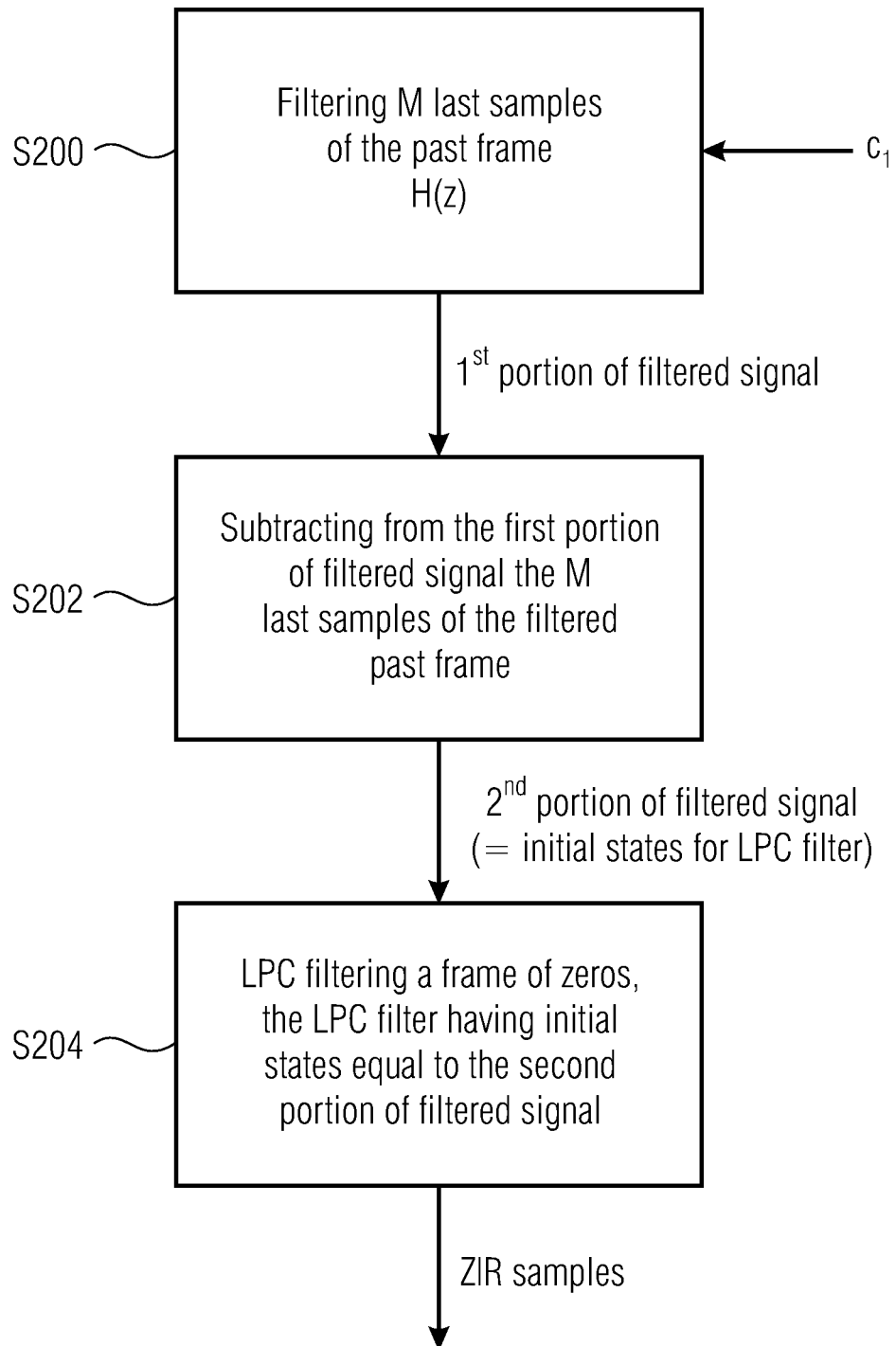
FIG. 6 shows a flow diagram representing the functionality of the block in FIG. 5 for generating the ZIR.

The functionality of the processing blocks 110 and 112 will now be described in further detail. FIG. 6 shows a flow diagram representing the functionality of the processing block 112 for generating the ZIR samples. As mentioned above, the frames of an audio signal 100 are filtered with a linear filter H(z) using filter parameters c selected or determined for the respective frame. The filter H(z) may be a recursive filer, e.g., an IIR filter, or it may be a non-recursive filter, e.g., a FIR filter. In the processing block 112 a LPC filter is used which may or may not be quantized. The LPC filter is of the order M and may be either estimated on the filtered or non-filtered audio signal or may be the LPC filter that is also used in an audio codec. In a first step S200, the M (M=the order of the LPC filter) last samples of the past frame n−1 are filtered with the filter H(z) using, however, the filter parameters or coefficients $c_1$ of the current frame n. Step S200 thereby produces a first portion of filtered signal. In step S202 the M last samples of the filtered past frame n−1 (the M last samples of the past frame filtered using the filter parameters or coefficients $c_0$ of the past frame n−1) are subtracted from the first portion of filtered signal provided by step S200, thereby producing a second portion of filtered signal. In step S204 the LPC filter having the order M is applied, more specifically a zero input response (ZIR) of the LPC filter is generated in step S204 by filtering a frame of zero samples, wherein the initial states of the filter are equal to the second portion of filtered signals, thereby generating the ZIR. In accordance with embodiments, the ZIR can be windowed such that its amplitude decreases faster to 0.

Figure 7:
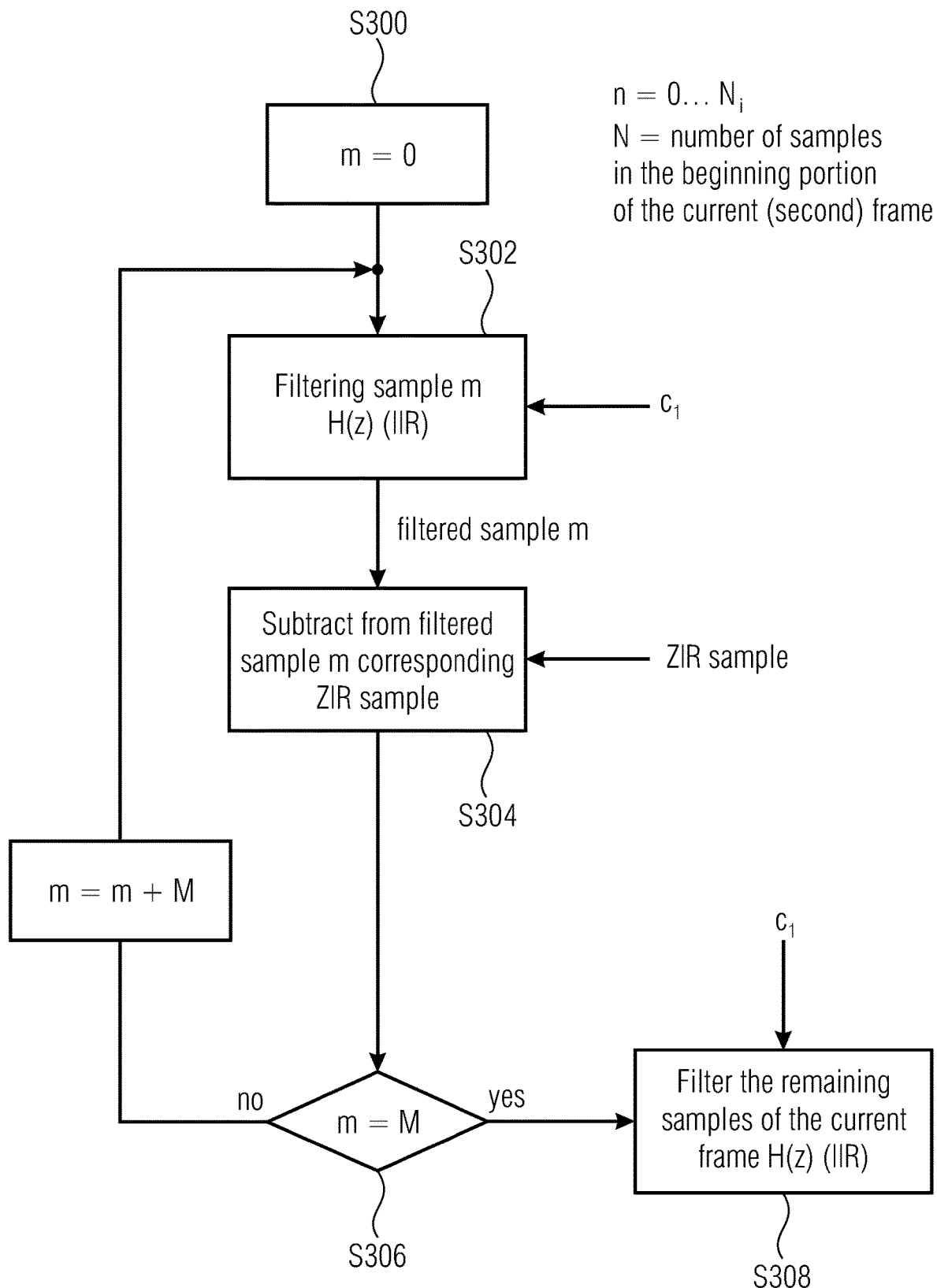
FIG. 7 shows a flow diagram representing the functionality of the block in FIG. 5 for processing the filtered current frame beginning portion in case the filter block comprises a recursive filter, like an IIR filter.

The ZIR, as described above with regard to FIG. 5, is applied in the processing block 110, the functionality of which is described with reference to the flow diagram of FIG. 7 for the case of using, as the linear filer H(z), a recursive filter, like an IIR filter. In accordance with the embodiment described with regard to FIG. 5, to remove discontinuities between the current frame and the past frame while avoiding undesired distortions, filtering the current frame n comprises processing (filtering) the current frame n on a sample-by-sample basis, wherein the samples of the beginning portion are treated in accordance with the inventive approach. To be more specific, M samples of a beginning portion of the current frame n are processed, and at a first step S300 the variables m is set to 0. In a next step S302, the sample m of the current frame n is filtered using the filter H(z) and the filter coefficients or parameters $c_1$ for the current frame n. Thus, other than in conventional approaches, the current frame, in accordance with the inventive approach, is not filtered using coefficients from the past frame, but only coefficients from the current frame, which as a consequence avoids the undesired distortion which exist in conventional approaches despite the fact that discontinuities are removed. Step S302 yields a filtered sample m, and in step S304 the ZIR sample corresponding to sample m is subtracted from the filtered sample m yielding the corresponding sample of the filtered current frame n. In step S306 it is determined whether the last sample M of the beginning portion of the current frame n is processed. In case not all M samples of the beginning portions have been processed, the variable m is incremented and the method steps S302 to S306 are repeated for the next sample of the current frame n. Once all M samples of the beginning portions have been processed, at step S308 the remaining samples of the current frame n are filtered using the filter parameters of the current frame $c_1$, thereby providing the filtered current frame n processed in accordance with the inventive approach avoiding undesired distortion upon removal of the discontinuities between consecutive frames.

Figure 8:
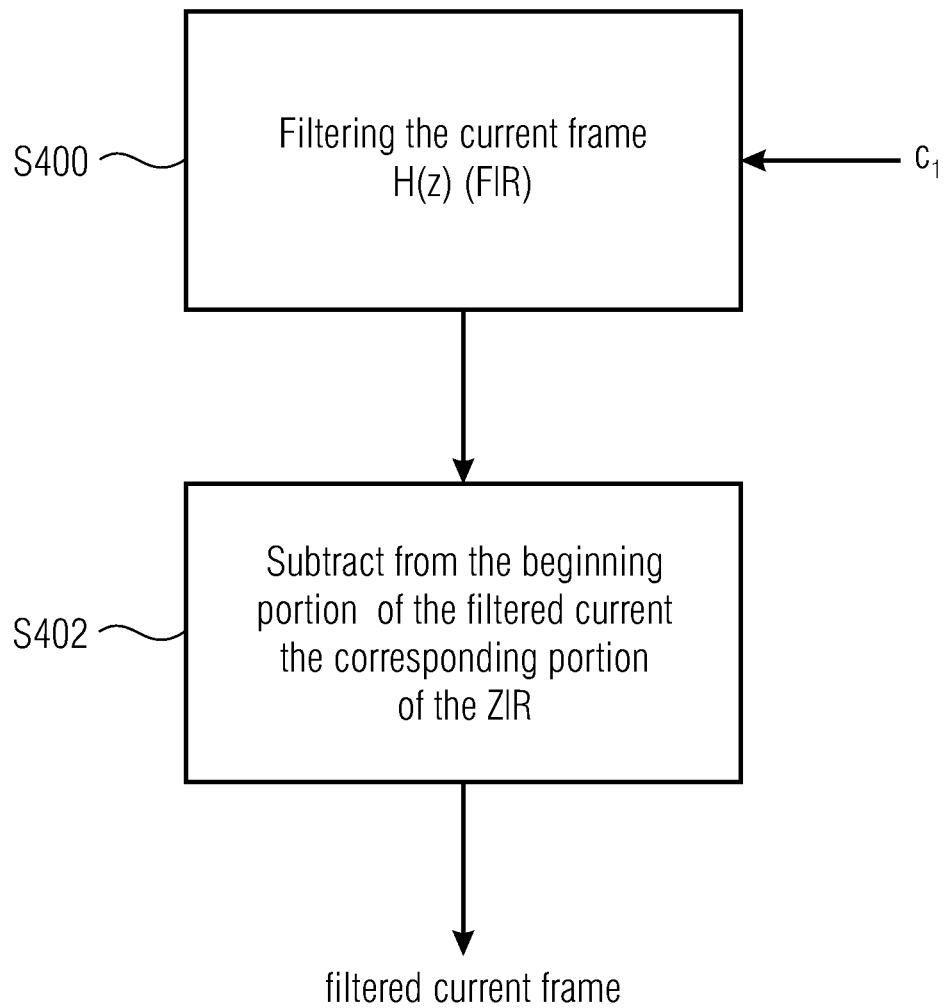
FIG. 8 shows a flow diagram representing the functionality of the block in FIG. 5 for processing the filtered current frame beginning portion in case the filter block comprises a non-recursive filter, like a FIR filter.

In accordance with another embodiment, the linear filer H(z) is a non-recursive filter, like a FIR filter, and the ZIR, as described above with regard to FIG. 5, is applied in the processing block 110. The functionality of this embodiment is described with reference to the flow diagram of FIG. 8. The current frame n, at step S400, is filtered with the filter H(z) using the filter coefficients or parameters $c_1$ for the current frame. Thus, other than in conventional approaches, the current frame, in accordance with the inventive approach, is not filtered using coefficients from the past frame, but only coefficients from the current frame, which as a consequence avoids the undesired distortion which exist in conventional approaches despite the fact that discontinuities are removed. In step S402 a beginning portion of the ZIR is subtracted from a corresponding beginning portion of the filtered current frame, thereby providing the filtered current frame n having the beginning portion filtered/processed in accordance with the inventive approach and the remaining part only filtered using filter coefficients or parameters $c_1$ for the current frame, thereby avoiding undesired distortion upon removal of the discontinuities between consecutive frames.

The inventive approach may be applied in situations as described above when the audio signal is filtered. In accordance with embodiments, the inventive approach may also be applied at the decoder side, for example, when using an audio codec postfilter for reducing the level of coding noise between signal harmonics. For processing the audio frames at the decoder the postfilter, in accordance with an embodiment, may be as follows:

$H(z)=(1-B(z))/(1-A(z)\cdot z^{-T})$ where B(z) and A(z) are two FIR filters and the H(z) filter parameters are the coefficients of the FIR filters B(z) and A(z), and T indicates the pitch lag. In such a scenario, the filter may also introduce a discontinuity between the two filtered frames, for example when the past filter frame parameters $c_0$ are different from the current frame filter parameters $c_1$, and such a discontinuity may produce an artifact in the filtered audio signal 104, for example a "click". This discontinuity is removed by processing the filtered current frame as described above in detail.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for decoding an audio signal, the method comprising:
   receiving the audio signal; and
   decoding the audio signal;
   wherein decoding the audio signal comprises processing consecutive audio frames of the audio signal to remove a discontinuity by linear predictive filtering, the discontinuity being between a filtered past frame and a filtered current frame of the audio signal, the filtered past frame being a past frame filtered using a set of past filter frame parameters, the filtered current frame being a current frame filtered using a set of current frame filter parameters, and the past filter frame parameters being different from the current frame filter parameters, and the processing comprising:
   acquiring, by a decoder, a signal by linear predictive filtering a predefined signal with initial states of a linear predictive filter, the initial states defined on basis of a last part of an unfiltered past frame filtered using the set of current frame filter parameters for filtering the current frame,
   filtering the current frame of the audio signal, and
   removing the discontinuity by modifying a beginning portion of the filtered current frame by the signal acquired by linear predictive filtering,
   wherein the linear predictive filter is defined as $$A(z)=1/(\Sigma_{m=0}^{M} a_m z^{-m})$$

with M the filter order and $a_m$ the filter coefficients, with $a_0=1$, and
   wherein decoding the audio signal comprises filtering the audio frames using the following filter:

$$H(z)=(1-B(z))/(1-C(z)\cdot z^{-T})$$

where B(z) and C(z) are two FIR filters and the H(z) filter parameters are the coefficients of the FIR filters B(z) and C(z), and T indicates the pitch lag.

2. The method of claim 1, further comprising estimating the linear predictive filter on the filtered or non-filtered audio signal.

3. The method of claim 2, wherein estimating the linear predictive filter comprises estimating the filter based on the past and/or current frame of the audio signal or based on the past filtered frame of the audio signal using the Levinson-Durbin algorithm.

4. The method of claim 1, wherein the linear predictive filter comprises a linear predictive filter of an audio codec.

5. A non-transitory digital storage medium having stored thereon a computer program for performing, when executed by a computer, a method for decoding an audio signal, the method comprising:
receiving the audio signal; and
decoding the audio signal;
wherein decoding the audio signal comprises processing consecutive audio frames of the audio signal to remove a discontinuity by linear predictive filtering, the discontinuity being between a filtered past frame and a filtered current frame of the audio signal, the filtered past frame being a past frame filtered using a set of past filter frame parameters, the filtered current frame being a current frame filtered using a set of current frame filter parameters, and the past filter frame parameters being different from the current frame filter parameters, and the processing comprising:
acquiring, by a decoder, a signal by linear predictive filtering a predefined signal with initial states of a linear predictive filter, the initial states defined on basis of a last part of an unfiltered past frame filtered using the set of current frame filter parameters for filtering the current frame,
filtering the current frame of the audio signal, and
removing the discontinuity by modifying a beginning portion of the filtered current frame by the signal acquired by linear predictive filtering,
wherein the linear predictive filter is defined as $$A(z)=1/(\Sigma_{m=0}^{M} a_m z^{-m})$$

with M the filter order and $a_m$, the filter coefficients, with $a_0=1$, and
wherein decoding the audio signal comprises filtering the audio frames using the following filter:

$$H(z)=(1-B(z))/(1-C(z)\cdot z^{-T})$$

where B(z) and C(z) are two FIR filters and the H(z) filter parameters are the coefficients of the FIR filters B(z) and C(z), and T indicates the pitch lag.

6. A decoder for decoding an audio signal, the apparatus comprising:
an input for receiving the audio signal; and
decoding the audio signal;
a processor configured to decode the audio signal,
wherein, for decoding the audio signal, the processor is configured to decode consecutive audio frames of the audio signal to remove a discontinuity by linear predictive filtering, the discontinuity being between a filtered past frame and a filtered current frame of the audio signal, the filtered past frame being a past frame filtered using a set of past filter frame parameters, the filtered current frame being a current frame filtered using a set of current frame filter parameters, and the past filter frame parameters being different from the current frame filter parameters,
wherein the processor is configured to
acquire a signal by linear predictive filtering a predefined signal with initial states of a linear predictive filter, the initial states defined on basis of a last part of an unfiltered past frame filtered using the set of current frame filter parameters for filtering the current frame,
filter the current frame of the audio signal, and
remove the discontinuity by modifying a beginning portion of the filtered current frame by the signal acquired by linear predictive filtering,
wherein the linear predictive filter is defined as $$A(z)=1/(\Sigma_{m=0}^{M} a_m z^{-m})$$

with M the filter order and $a_m$ the filter coefficients, with $a_0=1$, and
wherein decoding the audio signal comprises filtering the audio frames using the following filter:

$$H(z)=(1-B(z))/(1-C(z)\cdot z^{-T})$$

where B(z) and C(z) are two FIR filters and the H(z) filter parameters are the coefficients of the FIR filters B(z) and C(z), and T indicates the pitch lag.

* * * * *